United States Patent
Lo et al.

(10) Patent No.: US 7,105,235 B2
(45) Date of Patent: Sep. 12, 2006

(54) ISOTROPIC ZERO CTE REINFORCED COMPOSITE MATERIALS

(75) Inventors: Jason Sin Hin Lo, Nepean (CA); Nicola Maffei, Nepean (CA)

(73) Assignee: Her Majesty the Queen in right of Canada as represented by the Minister of Natural Resources, Ottawa (CA)

( * ) Notice: Subject to any disclaimer, the term of this patent is extended or adjusted under 35 U.S.C. 154(b) by 0 days.

(21) Appl. No.: 11/150,258

(22) Filed: Jun. 13, 2005

(65) Prior Publication Data

US 2005/0223846 A1 Oct. 13, 2005

Related U.S. Application Data

(63) Continuation-in-part of application No. 10/921,328, filed on Aug. 19, 2004, now abandoned, which is a continuation-in-part of application No. 10/147,460, filed on May 17, 2002, now abandoned.

(51) Int. Cl.
C22C 49/14 (2006.01)
C22C 49/06 (2006.01)
C22C 29/12 (2006.01)
B32B 33/00 (2006.01)

(52) U.S. Cl. .................. 428/614; 428/539.5; 428/632; 428/650; 501/102; 501/103; 501/94

(58) Field of Classification Search ............. None
See application file for complete search history.

(56) References Cited

U.S. PATENT DOCUMENTS

| | | | | |
|---|---|---|---|---|
| 5,514,360 A | * | 5/1996 | Sleight et al. | 423/594.12 |
| 5,763,344 A | * | 6/1998 | Komatsu | 501/98.4 |
| 5,773,042 A | | 6/1998 | Amano et al. | |
| 5,919,720 A | * | 7/1999 | Sleight et al. | 501/126 |
| 5,985,047 A | * | 11/1999 | Buxton et al. | 148/247 |
| 6,132,676 A | * | 10/2000 | Holzer et al. | 419/20 |
| 6,183,716 B1 | * | 2/2001 | Sleight et al. | 423/594.13 |
| 6,187,700 B1 | * | 2/2001 | Merkel | 501/32 |
| 6,193,915 B1 | * | 2/2001 | Lo et al. | 264/44 |
| 6,202,316 B1 | * | 3/2001 | Swift et al. | 33/503 |
| 6,247,519 B1 | * | 6/2001 | Lo et al. | 164/98 |
| 6,257,743 B1 | * | 7/2001 | Ursch | 362/418 |
| 6,258,743 B1 | * | 7/2001 | Fleming et al. | 501/102 |
| 6,355,340 B1 | * | 3/2002 | Singh et al. | 428/312.8 |

FOREIGN PATENT DOCUMENTS

| | | | |
|---|---|---|---|
| CA | 1154329 | * | 9/1983 |
| CA | 1157622 | * | 11/1983 |
| CA | 1244577 | * | 11/1988 |
| CA | 2028239 | * | 4/1991 |
| CA | 1316440 | * | 4/1993 |
| CA | 1325091 | * | 12/1993 |

OTHER PUBLICATIONS

Graham et al. in J. Amer. Ceram. Soc. 42, 570 in 1959.
Sleight et al. in Annu. Rev. Mater, Sci. 28, 29-43 in 1998.
Pepper et al in Met. Trans, ASM 2, 1971, p. 117.
Jackson et al. in Fibre Sci. Technol. 5, 1972, p. 219.
Nardone et al. in J. Mater, Sci. 22, 1987, p. 592.
Harrigan et al in ICCM, 1975, p. 849.
Chang et al in J. of Amer. Ceram. Soc., 50:4, 1967, p. 211.
Mary et al in Science 272, 1996, p. 90.
Taylor in British Ceram. Trans, 83, 1984, p. 5.
Holzer et al in J. Mater, Res. 14, No. 3, Mar. 1999, 780-789.
Mavoori et al. in JOM, Jun. 1998, p. 70-72.
Shi et al. in Mat. Res. Soc. Symp. Proc. vol. 445—Mat. Res. Soc, 1997, p. 229-234.
Mary et al in J. Mater. Res., vol. 14, No. 3, Mar. 1999—Mat. Res. Soc., 19999, p. 912-915.
Metals Handbook (9th ed.), vol. 7, Powder Metallurgy, American Society for Metals, 1984, p. 301, Ohio, USA.

* cited by examiner

*Primary Examiner*—Jennifer McNeil
*Assistant Examiner*—Jason L. Savage
(74) *Attorney, Agent, or Firm*—Shapiro Cohen

(57) ABSTRACT

A reinforced composite material, having isotropic thermal expansion properties and a low coefficient of thermal expansion over at least the temperature range of from about 0° C. to at least about 150° C., which composite material comprises in combination a first continuous phase comprising a three dimensional preformed bonded powder material reinforcement, including a bonding agent, and in which the bonded powder material is chosen from the group consisting of zirconium tungstate, hafnium tungstate, zirconium hafnium tungstate, and mixtures of zirconium tungstate and hafnium tungstate, and a second continuous phase matrix material chosen from the group consisting of aluminium, aluminium alloys in which aluminium is the major component, magnesium, magnesium alloys in which magnesium is the major component, titanium, titanium alloys in which titanium is the major component, engineering thermoplastics and engineering thermoplastics containing a conventional solid filler.

11 Claims, No Drawings

ISOTROPIC ZERO CTE REINFORCED COMPOSITE MATERIALS

This is a Continuation-in-part of U.S. patent application, Ser. No. 10/921,328 filed Aug. 19, 2004 now abandoned, which is a Continuation-in-part of U.S. patent application, Ser. No. 10/147,460 filed May 17, 2002 now abandoned.

FIELD OF THE INVENTION

This invention relates to reinforced composite materials in which the two continuous phases comprising respectively the matrix and the reinforcing material used to fabricate the composite material cooperate to provide a composite material having a zero, or near zero, coefficient of thermal expansion (CTE) in the conventional mutually perpendicular X, Y and Z directions. The reinforced composite materials of this invention are thus described as being isotropic with respect to their thermally induced expansion behaviour.

SUMMARY OF INVENTION

In the field of low CTE materials there are several accepted units used to express CTE values; in what follows, with the exception of the discussion of the prior art, all CTE values are all expressed $10^{-6}/^\circ$ K., which is to say that an aluminum A242 alloy has a CTE of $22.5 \times 10^{-6}/^\circ$ K.

The possibility of creating an object having a zero, or near zero, CTE in at least one direction has been of interest for a very long time. For example, escapement mechanisms for timepieces which include components having a zero, or near zero, CTE over at least the range of temperatures to which the timepiece is likely to be exposed are well known; one example is a compensated pendulum. In these devices, a thermally induced dimensional change in one part is balanced by the behaviour of another part of the structure.

As an alternative, some alloys having a low CTE have been developed, of which Invar(trade mark) is perhaps the most well known. Invar is a commercially available iron-nickel alloy containing about 64.5% iron and about 35.5% nickel. Invar type alloys having an iron and nickel content close to these values have substantially isotropic thermal expansion characteristics, with a low CTE value of from about 1 to about $2 \times 10^{-6}/^\circ$ K. In order to obtain this low CTE value, the composition of the alloy has to be very carefully controlled.

For many applications, Invar has three significant disadvantages: it is an expensive alloy to make, it is expensive to machine or fabricate into complex shapes, and it is relatively heavy (the density of Invar is 8.1 g/cc), compared either to alloys based on light metals such as magnesium and aluminium, to the so-called engineering plastics, or to reinforced composite plastic materials comprising a polymer matrix together with a reinforcement.

Two current major applications of low CTE materials are in thermal management hardware such as heat sinks and the like for solid state electronic devices, and in signal transmission antenna structures for both transmitting and receiving complex signals in microgravity environments. Thermal management is an essential feature of the design of solid state electronic devices, and dimensional thermal stability is extremely important for antennas used in microgravity applications in space which are exposed to a relatively wide temperature range; relatively small changes in dimensions can radically alter the performance of an antenna.

At present, in some signal transmission applications Invar is used. However this step involves fabricating complex structures from a single Invar billet: the machining costs for creating such structures are enormous. Additionally, the weight of an Invar structure is not attractive for microgravity applications in space.

Although reinforced composite materials based on magnesium, magnesium alloys, aluminium, aluminium alloys and engineering plastics are all attractive for applications where weight is a significant consideration, these materials all have significant CTE values; for example, that for aluminium and most aluminium alloys is about $25 \times 10^{-6}/^\circ$ K. For a number of modern uses, this level of thermal expansion is not acceptable.

In an effort to overcome these problems, a number of composite materials have been developed, of which at least one is commercially available. This is a metal matrix composite, in which the metal matrix is aluminium, or an aluminium alloy, and the reinforcing material is carbon fibres. In these composites, the negative CTE of the carbon fibres is used to balance the positive CTE of the metal; it is then theoretically possible to fabricate a reinforced composite that has a zero CTE; in practise a near zero CTE is a more realistic target.

This approach suffers from a significant disadvantage: the reinforced composite has a controllable CTE only in the direction in which the required balance between the volume fraction of carbon fibres oriented in that direction and the volume fraction of the surrounding metal matrix is achieved. In all other directions, the CTE of the composite may be either higher or lower than the target value—which in the case of carbon fibre reinforced materials can include negative CTE values—depending on the volume fraction relationship between the carbon fibres, if any, actually oriented in a particular direction and the metal. A carbon fibre composite is therefore not isotropic in its thermal expansion behaviour; the directional variance of CTE in the composite structure complicates structure design, since the anisotropic thermal behaviour causes thermally induced stresses in the reinforced composite material. The resulting anisotropic shape changes can adversely affect device performance.

In practise it has proven effectively impossible to achieve truly random orientation of the carbon fibres in a metal matrix composite, even when that is desired in the structure being made. For many reinforced metal matrix composite structures, both the volume fraction of, and the location of, the reinforcement in the resulting composite structure is carefully chosen. In order to ensure that the reinforcement is correctly placed, the reinforcement is often first formed into a carefully chosen structure, into which the metal matrix is infiltrated, for example by using the technique known as squeeze casting.

A ternary oxide material with unusual CTE properties was first reported by Graham et al. in J. Amer. Ceram. Soc. 42, 570 in 1959. This material is described as zirconium tungstate, and has the formula $ZrW_2O_8$. The CTE of this compound was reported by Sleight et al., in Ann. Rev. Mater. Sci., 28, 29–43, to be isotropic and negative, over the range of $-253°$ C. to $+780°$ C. In U.S. Pat. No. 5,541,360 Sleight et al. additionally state that the closely related compound hafnium tungstate also has a negative CTE over the range of from about $10°$ C. to about $780°$ C. For both compounds, the CTE is reported to be about the same. For zirconium tungstate it is $-8.7 \times 10^{-6}/^\circ$ K. below about $150°$ C. and $-4.9 \times 10^{-6}/^\circ$ K. from $150°$ C. up to about $700°$ C.; the change at $150°$ C. is stated to be related to a reversible phase transition in the crystal structure at that temperature.

In U.S. Pat. No. 6,132,676 Holzer et al. describe a minimal thermal expansion, high thermal conductivity metal-ceramic composite. In these composites the ceramic is zirconium tungstate, hafnium tungstate, or a combination thereof, dispersed as relatively small particles within a continuous metal matrix in which the metal is typically a malleable metal such as copper. The composite is obtained by coating particles of the ceramic with a layer of the metal, followed by hot isostatic compression of the particles. It is pointed out by Holzer et al. that in the pressing step the applied force must be sufficient to "allow breakage of the native metal oxide layer that exists on most metal particles, particularly the non-noble metals" (see Col. 7, lines 34–36). Holzer et al. also state at several locations that the "application of force . . . results in a composite article including a discontinuous phase of the first [ceramic] component dispersed within a continuous phase of the second [metal] component . . . with the avoidance of any direct impact between particles of the first [ceramic] component(see Col 7, lines 21–24; see also Col. 9, at lines 60–63). Holzer et al. do not consider the possibility that the second component need not be a metal.

In U.S. Pat. No. 6,258,743 Fleming et al. describe ceramic monoliths which exhibit tunable CTE values from about $-5$ to $-11 \times 10^{-6}$/° C. near ambient temperatures. These two phase ceramics, which are fabricated, for example, by reactive sintering of oxide mixtures in which the components are chosen in two groups from $WO_3$, $HfO_2$, $V_2O_5$ and $ZrO_2$, are stated to consist of, for example, a two; phase system comprising a matrix of $ZrW_2O_8$ with inclusions of $ZrO_2$. These complex two phase ceramics are intended to be used as substrates for thermally compensating fiber Bragg gratings.

DETAILED DESCRIPTION OF THE INVENTION

It has now been found that the compounds zirconium tungstate, hafnium tungstate and the double compound zirconium hafnium tungstate can be used as the reinforcement to provide a substantially isotropic composite material having a low or zero CTE in which the matrix is chosen from the group consisting of aluminium, aluminium alloys in which aluminium is the main component, magnesium, magnesium alloys in which magnesium is the major component, and engineering thermoplastics. The zirconium or hafnium tungstate is provided as a three dimensional bonded powder preform, which can be prepared by the technique described by Lo and Santos in U.S. Pat. No. 6,193,915. The reinforced composite is prepared from the bonded powder preform by investing it with the matrix material, for which step the squeeze casting process is preferred.

Lo and Santos also state that "It also follows that in addition to corresponding to the required low volume fraction, the finished preform must have sufficient structural strength to be handled, and to survive the metal infiltration process, which often is a squeeze casting step carried out at a pressure of about 100 MPa.". It then follows that the final metal matrix composite body is a two phase system: a first continuous non-metallic phase comprising the bonded powder preform in which the reinforcement is bonded to itself to provide a stable three dimensional structure, and a second metal matrix continuous phase which is invested as a molten liquid into the bonded powder reinforcement preform.

It can thus be seen that the composite materials of this invention differ from the composite materials described by Holzer et al. in several respects. First, using the language used by Holzer et al., the composite materials of this invention are not a two component material: a third component is present which is the material, typically silica, which bonds the ceramic particles of the first component into a continuous phase as the bonded powder preform. Second, pressure is not relied upon to convert the coating applied to the first component into a continuous phase. Instead, molten material is used to provide a continuous phase. Neither of these options are considered at all by Holzer et al; indeed as noted above Holzer et al. specifically teach against bonding the ceramic component powder particles together into a continuous phase.

It can also be seen that the ceramic component in the composite materials of this invention differ from the complex ceramics disclosed by Fleming et al. Fleming et al. do not consider the possibility of using these complex two phase ceramics as the reinforcing component in a zero CTE reinforced composite material. Further, Fleming et al. do not consider the possibility of using a single phase ceramic material. Additionally, Fleming et al. do not consider using these complex ceramics as a preform with a high void volume: the ceramics are always fabricated as a monolithic reactive sintered body; there is no consideration of preparing these complex reactive sintered ceramics as fibers or as whiskers. Finally, Fleming et al. do not seek to provide an isotropic product with a low CTE.

Thus in its broadest embodiment this invention seeks to provide a reinforced composite material, having isotropic thermal expansion properties and a low coefficient of thermal expansion over at least the temperature range of from about 0° C. to at least about 150° C., which composite material comprises in combination a first continuous phase comprising a three dimensional preformed bonded powder material reinforcement, including a bonding agent, and in which the bonded powder material is chosen from the group consisting of zirconium tungstate, hafnium tungstate, zirconium hafnium tungstate, and mixtures of zirconium tungstate and hafnium tungstate, and a second continuous phase matrix material chosen from the group consisting of aluminium, aluminium alloys in which aluminium is the major component, magnesium, magnesium alloys in which magnesium is the major component, titanium, titanium alloys in which titanium is the major component, engineering thermoplastics and engineering thermoplastics containing a conventional solid filler.

Preferably, the bonding agent in the preformed bonded powder material reinforcement is silica.

Preferably, the bonded powder material reinforcement is zirconium tungstate.

Preferably, the coefficient of thermal expansion of the composite material is between $-1 \times 10^{-6}$/° K. and $+1 \times 10^{-6}$/° K. over the temperature range of from about 0° C. to about 150° C.

Preferably, the volume fraction of preformed bonded powder material reinforcement in the composite material is from about 40% to about 60%. Most preferably, the volume fraction of preformed bonded powder reinforcement material in the composite material is substantially 50%.

In preparing the reinforced composite materials of this invention, it is preferred that the preformed bonded powder material reinforcement is invested with the matrix material using the squeeze casting technique, or a suitable variant thereof where the matrix material is an engineering plastic with or without a conventional solid filler material. For such thermoplastic materials temperatures lower than those used for metal matrices generally will be necessary. Although a number of bonding agents have been described for preparing preforms for use in the preparation of metal matrix reinforced composite materials, for this invention a suitable bonding agent is silica, as this does not appear to induce any unacceptable changes in the reinforcement material. Since the reinforced composite material is required to be isotropic, use of the reinforcement as fibres or whiskers is not desirable, unless the fibres or whiskers are short enough to provide the required isotropic behaviour. A suitable method for preparing a low volume fraction powder based preform is described by Lo and Santos, in U.S. Pat. No. 6,193,915.

It should also be noted that some care needs to be taken when the matrix to be used is either magnesium, or an alloy containing a significant amount of magnesium. Molten magnesium is known to be a very reactive material, and will react with silica to form a magnesium-silicon alloy, magnesium oxide and a spinel of the formula $MgAl_2O_4$. Although the presence of some silicon in a magnesium alloy is not usually a problem, the presence of magnesium oxide crystals is not desirable as they are known to affect adversely the strength properties of the metal. Additionally, when either zirconium tungstate, hafnium tungstate, zirconium hafnium tungstate, or mixtures of zirconium and hafnium tungstates are used as the reinforcement with silica as the bonding agent in the powder preform there is also the risk that in addition to both silicon and magnesium oxide being formed, spinel-like compounds may be formed by reaction with the reinforcement material. It is therefore desirable that if the matrix material is magnesium, or an alloy containing a significant amount of magnesium, then the bonded powder material preform may need to be given a protective coating that is not affected by molten magnesium prior to investing the metal into it. If the processing time during which the reinforcement is exposed to the molten metal matrix is short, as is the case for squeeze casting, the minimal reaction between the molten metal alloy and the reinforcement will likely improve the bond between them. If a coating is found to be necessary it can be applied to the reinforcement preform by electroless plating or by vapour deposition. Problems of this nature should not arise when an engineering plastic, with or without a conventional solid filler, is the matrix material.

EXAMPLE

A) Synthesis of Zirconium Tungstate, $ZrW_2O_8$

Powdered zirconium oxide($ZrO_2$) and tungsten oxide ($WO_3$), with a purity in each case of 99.5%, were mixed at a weight ratio of 1 part $ZrO_2$ to 2 parts $WO_3$ for 30 minutes in a mechanical mixer. Portions of from about 25 g to about 30 g. of the powder mixture were then reacted in the solid state at about 1,225° C. until the desired phase changes had occurred. For small samples, the reaction can be completed in less than about 15 minutes; for the large samples used in this experiment the reaction was complete in 24 hours. The phase content and particle size of the product was monitored on samples taken after 24, 48 and 96 hours by X-ray diffraction with Cu K, radiation. The particle size in the reaction product does not appear to change after 24 hours.

(B) Bonded Powder Preform Preparation

The powdered zirconium tungstate was converted into a preform using the Lo and Santos method noted above. The powder was converted into a thick slurry with the binder system including colloidal silica, and then poured into a mould. The mould was slow cured to a green preform in an oven at 50° C. for 18 hours. The dried green preform was then fired following the programmed firing sequence set out by Lo and Santos to provide a three dimensional silica bonded powder preform. Sufficient powdered zirconium tungstate was used in the preform to provide a 50% volume fraction of reinforcement in the composite material.

(C) Matrix Infiltration

The bonded preform was placed in a mould, and aluminium alloy #201 was squeeze cast into the preform in the mould to provide a reinforced composite material in which the aluminium alloy is the second continuous matrix phase. The mould was sized to provide a composite material containing 50% by volume of metal matrix and 50% by volume of reinforcement. The composite material was found to be isotropic, with a CTE value up to at least 120° C. of $+0.2 \times 10^{-6}$/° K. The CTE was measured using a suitable dilatometer.

Having thus described the invention, what is claimed as new and secured by Letters Patent is:

1. A reinforced composite material, having isotropic thermal expansion properties and a low coefficient of thermal expansion over at least the temperature range of from about 0° C. to at least about 150° C., which composite material comprises in combination a first continuous phase comprising a three dimensional preformed bonded powder material reinforcement, including a bonding agent, and in which the bonded powder material is chosen from the group consisting of zirconium tungstate, hafnium tungstate, zirconium hafnium tungstate, and mixtures of zirconium tungstate and hafnium tungstate, and a second continuous phase matrix material chosen from the group consisting of aluminium, aluminium alloys in which aluminium is the major component, magnesium, magnesium alloys in which magnesium is the major component, titanium, titanium alloys in which titanium is the major component, engineering thermoplastics and engineering thermoplastics containing a conventional solid filler.

2. A composite material according to claim 1 wherein the bonding agent in the preformed bonded powder material reinforcement is silica.

3. A composite material according to claim 1 wherein the bonded powder material in the preformed bonded powder material reinforcement is zirconium tungstate.

4. A composite material according to claim 1 wherein the coefficient of thermal expansion of the composite material is between $-1 \times 10^{-6}$/° K. and $+1 \times 10^{-6}$/° K. over the temperature range of at least from about 0° C. to at least about 150° C.

5. A composite material according to claim 1 wherein the volume fraction of preformed bonded powder material reinforcement in the composite material is from about 40% to about 60%.

6. A composite material according to claim 1 wherein the volume fraction of preformed bonded powder material in the composite is substantially 50%.

7. A composite material according to claim 1 wherein the matrix material is aluminium or an aluminium alloy.

8. A reinforced metal matrix composite material, having isotropic thermal expansion properties and a low coefficient of thermal expansion over at least the temperature range of from about 0° C. to at least about 150° C., which composite material comprises in combination a first continuous phase comprising a three dimensional preformed bonded powder material reinforcement in which the bonded powder material is chosen from the group consisting of zirconium tungstate, hafnium tungstate, zirconium hafnium tungstate, and mixtures of zirconium tungstate and hafnium tungstate, and a second continuous phase matrix material chosen from the group consisting of aluminium, aluminium alloys in which aluminium is the major component, magnesium, and magnesium alloys in which magnesium is the major component.

9. A composite material according to claim 8 wherein the volume fraction of preformed bonded powder material reinforcement in the composite material is from about 40% to about 60%.

10. A composite material according to claim 8 wherein the volume fraction of preformed bonded powder material in the composite is substantially 50%.

11. A composite material according to claim 8 wherein the matrix material is aluminium or an aluminium alloy.

* * * * *